Patented June 2, 1942

2,285,366

UNITED STATES PATENT OFFICE 2,285,366

METHOD OF MAKING TERPENE DERIVATIVES

Donald H. Sheffield, Brunswick, Ga., assignor to Hercules Powder Company, Wilmington, Del., a corporation of Delaware No Drawing. Application October 3, 1939, Serial No. 297,673

14 Claims. (Cl. 260—611)

This invention relates to a method of preparing terpene derivatives. More particularly it relates to a method for the simultaneous preparation of terpene alcohols and terpene ethers. It further relates to a method of preparing an improved surface active agent and to an improved surface active agent.

Terpene ethers have been prepared by the reaction of an alcohol with pinene, the reaction being catalyzed by a suitable acid. As usual in etherification reactions, the reaction has been carried out under anhydrous or substantially anhydrous conditions. Under these conditions, relatively low yields of useful product are obtained because of decomposition of the product, polymerization, formation of unstable acidic terpene compounds, and other side reactions causing loss and wastage of the pinene and difficulty in the recovery of the desired product. Certain ethers are so unstable under anhydrous acid conditions, the conditions heretofore known to produce ethers, as to be practically unobtainable, that is entirely unobtainable or obtainable only in very small yields.

It is an object of this invention to provide a method of preparation of terpene ethers from pinene without substantial wastage of the reactants. It is thus an object of this invention to provide a simple and expedient method of preparing terpene ethers accompanied by greatly reduced formation of decomposition products, acidic terpene compounds, polymerization products and the like undesired by-products.

It is a further object to prepare terpene ethers which are unstable under the usual conditions of ether preparation and thus have been heretofore unobtainable or obtainable only in very small yields.

It is also an object to react pinene to a high yield of useful products. It is also an object to prepare terpene ethers and terpene alcohols simultaneously from pinene.

It is a further object to prepare terpineol from pinene by a simple and expedient method in which a high utilization of equipment and a high yield of useful products are obtained.

It is a still further object to prepare a new improved surface active agent characterized by a low freezing point. It is a still further object to prepare such an agent further characterized by a very low or mild odor.

In accordance with this invention, I accomplish these objects by reacting pinene with a mixture of water and an alcohol in the presence of a suitable acidic catalyst whereby terpineol and a terpene ether are simultaneously formed. Usually an oily layer which contains the desired products is readily separated. Any catalyst remaining therein is removed or inactivated. Excess reactants may then be removed by distillation. The mixed product may then be fractionated into its components or, if desired, it may be used for some purposes without further treatment.

In the process according to this invention, the quantity of water present in the reaction is sufficient substantially to prevent the formation of decomposition products, polymerized products, and other undesired side reaction products which have no value and which interfere with the recovery of the desired product. Surprisingly, the water does not prevent the formation of the terpene ether, but actually prevents decomposition of the terpene ether by the catalyst. The result is a novel large yield of useful products from the pinene reacted upon, unobtainable by conducting reactions with water and an alcohol separately, with corresponding economy of production. Terpene ethers and terpineol are useful and valuable products. Furthermore, the relative quantities of terpene ether and terpineol produced may readily be varied over a wide range.

The process in accordance with this invention further provides in another sense an improved method for preparing terpineol. The presence of an alcohol such as methanol, ethanol, ethylene chlorhydrin, etc. in the reaction mixture greatly facilitates the formation of terpineol from water and an unsaturated terpene, yield of useful product being increased and time of reaction being reduced. Since the alcohol present is in part reacted to useful products, its presence does not reduce the useful capacity of the reaction vessel.

Conveniently, the pinene may be in the form of a turpentine. The turpentine may be either wood or gum turpentine of either the American or the French type. Of course, pure pinene may be used if desired but turpentine, which I define herein as a terpene fraction rich in pinene, is usually satisfactory. Both the alpha and beta form are included in the term pinene as used herein and in the claims.

The alcohol which may be employed as one of the reactants in the process of my invention may be a monohydric alcohol such as, for example, methyl, ethyl, propyl, isopropyl, butyl, isobutyl, betachloroethyl, chloropropyl, bromoethyl, bromopropyl, tetrahydrofurfuryl, or benzyl alcohol, and so forth, or it may be a polyhydric alcohol, such as, for example, ethylene glycol, propylene glycol, trimethylene glycol, diethylene glycol, triethylene glycol, glycerol, and so forth. It may be a substituted alcohol, provided, of course, that an alcoholic hydroxyl group is retained. It will be understood that I do not consider a phenolic hydroxyl as an alcoholic hydroxyl group.

The reaction between the pinene or turpentine and the mixture of water and the alcohol is carried out with the aid of a suitable acid catalyst. I find the non-carboxylic polybasic acids and their acidic derivatives to be particularly suitable; for example, phosphoric acid, sulphuric acid, sodium acid sulphate, potassium acid sulphate, benzene sulphonic acid, toluene sulphonic acid, ethyl sulphonic acid, ethyl sulphuric acid, etc. are suitable catalysts. Other acids, such as the strong monobasic inorganic acids, may be used if desired, but they tend to induce lower yields, or to give products contaminated by difficultly removable by-products.

The temperature which I employ will depend upon the particular acid utilized as the catalyst and upon the quantity of catalyst used. With high concentrations of catalyst the reaction proceeds at low temperatures, and in fact, in such cases, the temperature must be kept low to prevent decomposition and rearrangement of the products. Higher temperatures are used with a low catalyst concentration. For example, sulphuric acid is desirably not employed in concentrations higher than 60% based on the mixture of acid and water present at a temperature of 0° C. nor is it desirably employed in concentrations lower than 2% on the same basis at a temperature of 70° C. However, when using sulphuric acid I prefer a concentration in the range of from 25% to 35% based on the mixture of acid and water present and preferably I carry out the reaction at a temperature in the range from 30° C. to 50° C.

The reaction conditions can be varied widely. Optimum conditions depend upon the catalyst utilized. For example, reaction at 40–45° C. in the presence of 37.5% phosphoric acid yields results comparable to those obtained by 10.5% sulphuric acid under similar conditions; likewise, 2% sulphuric acid gives results similar to 26–27% sodium acid sulphate. Conditions which may be used with sulphuric acid as the catalyst have been mentioned hereinbefore. However, if phosphoric acid is used as the catalyst, a concentration less than 75%, based on the mixture of water and acid present, is undesirable at 0° C., and a concentration less than 5% on the same basis is undesirable at 70° C. When using sodium acid sulphate, I prefer a concentration in the range of from 20% to 30% at a temperature of from 50° C. to 70° C. When using benzene sulphonic acid, I prefer a concentration in the range of from 30% to 35% at a temperature in the range from 35° C. to 45° C.

In general I prefer to avoid high reaction temperatures since there is excessive loss by decomposition of the product to undesired materials such as monocyclic hydrocarbons. At low temperatures excessive formation of side reaction products, such as terpin hydrate, occurs and the desired reaction is too slow. It is, in general, undesirable to carry out the reaction at above about 70° C. or below about 0° C. I find a temperature in the range of from about 30° C. to about 50° C. to be preferable.

The ratio of the lower aliphatic alcohol to the water in the mixture which is reacted with the pinene will depend upon the ratio of terpene ether to terpineol desired in the product, and upon the particular alcohol utilized. The proportion of terpene ether in the product increases with the proportion of the alcohol in the reactant mixture. However, sufficient water should be present under the reaction conditions utilized to insure formation of both terpene alcohol and terpene ether and to prevent substantial decomposition of the terpene ether by the acid catalyst and to prevent the formation of undesirable acidic terpene compounds and other undesirable side reaction products. The minimum quantity of water will vary somewhat with the stability of the particular ether being synthesized, but in general the weight ratio of the alcohol to water should not exceed about 15 to one. The proportion of the alcohol to the water in the reactant mixture may be varied in the ratio of from about 15:1 to about 1:5; preferably in the range from about 5:1 to about 1:1. The mixture of alcohol and water will be in excess of the quantity theoretically required to react with the pinene. An excess of about five times that theoretically required by the pinene available is suitable, although wide deviations from this quantity may be made.

In carrying out the reaction according to this invention, the turpentine or pinene, alcohol, water and catalyst are desirably agitated throughout the reaction. The reaction mixture is preferably cooled to maintain the temperature in the desired range so as to obtain the desired products since the reaction is exothermic. The reaction time will depend upon the kind and quantity of catalyst utilized, and upon the temperature at which reaction is maintained. It will usually be of the order of about 5 hours to about 8 hours when operating under the preferred conditions hereinbefore mentioned. However, it is undesirable to prolong the reaction beyond the time required to obtain a good yield since the desired products may react further with consequent loss of yield. Preferably the products are recovered promptly as soon as the reaction is substantially complete. After substantial completion of the reaction, two layers will usually form. The lower layer contains the excess water and most of the catalyst and excess alcohol. This lower layer may be drawn off and reused after adjustment of the reagents. The upper oily layer contains the terpinic products, some alcohol and a portion of the catalyst. This oily layer is neutralized with sodium hydroxide, sodium carbonate or the like, for example, by washing with an alkaline water solution. Alcohol contained in this layer is then distilled off conveniently at atmospheric pressure.

Unreacted pinene or turpentine and any other hydrocarbons present may then be removed from the mixture of terpineol and terpene ether preferably by distillation at a reduced pressure. The terpineol and terpene ether may then be separated by fractionation preferably at a reduced pressure. However, for some purposes the terpineol and terpene ether need not be separated but may be used as a mixture. Also, in certain cases the products may be used without removal of the unreacted terpene hydrocarbons. Where a mixture of ethers is desired in the product, more than one alcohol may be reacted with the pinene.

The method in accordance with this invention finds a special and valuable application in the preparation of certain terpene ethers which are quite unstable under the usual subtsantially anhydrous acidic conditions of ether formation. Such ethers form a group of compounds which thus have been unobtainable or obtainable only in small yields. A case in point is terpinyl beta-chloroethyl ether. Now it has been found that excellent yields of this ether can be obtained by reacting pinene with a mixture of water and ethylene chlorhydrin in the presence of a suitable acidic catalyst. The proportion of ethylene chlorhydrin to the water in the reaction mixture may be varied widely and depends upon the proportions of terpineol and terpinyl beta-chloroethyl ether desired. For example, I may use ethylene chlorhydrin in a quantity from about 20 times the weight of the water used to about one half the weight of the water used, preferably the quantity of ethylene chlorhydrin is from about 3 times to about 10 times the weight of the water. A very high yield of the ether and a very high yield of total useful products are thus obtained from the pinene utilized as the reactant.

The preparation of terpenyl beta-chloroethyl ether is carried out in the general manner hereinbefore described, taking care, however, to use mild conditions of reaction. Relatively low concentrations of the acid catalyst are preferable. Preferably phosphoric acid in concentration from about 50% to about 75% based on the water and acid present is utilized as the catalyst at a temperature preferably in the range of from about 35° C. to about 50° C. The products are recovered as hereinbefore mentioned. The terpinyl beta-chloroethyl ether is useful per se, for example, as a solvent to be used in paints and lacquers, or it may be used to modify surface tension as in flotation of minerals and as a detergent aid, or it may be used as an intermediate in the preparation of other compounds. Other terpene ethers which belong in the same group as terpinyl beta-chloroethyl ether in that they are not readily prepared under the usual anhydrous acidic conditions are terpene ethers of halogen substituted aliphatic radicals such as terpene chloropropyl ethers, terpene chlorobutyl ethers, terpene bromoethyl ethers, terpene bromopropyl ethers, etc. Also in the group of terpene ethers not readily prepared under the usual anhydrous acidic conditions are the terpene ethers prepared from monohydroxy aliphatic radicals which contain the carbon-oxygen-carbon linkage, for example, the terpene ethers formed by etherification reaction of the hydroxy groups of the monomethyl ether of ethylene glycol, the monoethyl ether of ethylene glycol, the monobutyl ether of ethylene gycol, the corresponding ethers of diethylene glycol (i. e. terpene ethers of the "Cellosolves" and "Carbitols"), and so forth. Also included among the ethers of radicals containing the carbon-oxygen-carbon linkage are terpene ethers formed by etherification reaction of a hydroxyl group of the esters of hydroxy carboxylic acids, for example, terpene ethers of ethyl glycollate, methyl glycollate, propyl glycollate, isopropyl glycollate, etc.; methyl lactate, ethyl lactate, propyl lactate, isopropyl lactate, etc.; similar esters of malic and citric acid, etc.

While in the foregoing description of my invention, only reactions involving pinene have been mentioned, in a broader concept of the invention, the method applies to dicylic unsaturated terpene compounds generally. Thus, in place of pinene, in the description and examples, sabinene, the fenchenes, bornylene, the carenes, etc., may be utilized in recation with a mixture of water and an alcohol whereby a terpene alcohol and a terpene ether of the type formed by additive reaction of an aliphatic alcohol with the terpene is produced.

The method in accordance with this invention has the further utility of providing a means of preparing a new surface active agent which is superior to prior products of similar utility, i. e. natural terpene fractions, in being characterized by a lowered freezing point which is of great value in shipping and handling. It further has only a very mild, slightly flowery odor as compared with the rather strong irritating, persistent odor of prior products. This product I prepare by reacting pinene or turpentine with a mixture of water and a lower aliphatic alcohol under suitable conditions to obtain a mixture of terpineol and the terpinyl ether of the lower aliphatic alcohol.

The lower aliphatic alcohols which I use in preparing my surface active composition may be methyl alcohol, ethyl alcohol, isopropyl alcohol, etc. Butyl and amyl alcohols may be utilized where the odor of the product is of no consequence. The conditions of reaction will be as hereinbefore described as suitable for the simultaneous preparation of terpineol and a terpinyl ether adjusting the weight ratio of the lower aliphatic alcohol to water to obtain the particular ratio of terpineol and ether desired in the product. For example, utilizing ethyl alcohol, its ratio to water will be within the range of from about 1:5 to about 1:1 to obtain a mixture of terpinyl ethyl ether and terpineol ranging respectively from about 15% to about 50% of the ether. Upon substantial completion of the reaction, the oily layer containing the product is promptly separated from the aqueous layer and any catalyst associated with the product is neutralized. Any alcohol in the oily layer is then removed by distillation. Unreacted pinene and any other terpene hydrocarbons present may then be removed by fractionation preferably at reduced pressure, although for some uses this step may be omitted.

The product thus obtained comprises essentially a mixture of terpineol and terpinyl ether of the lower aliphatic alcohol utilized, the terpinyl ether being in quantity ranging from about 15% to about 50% of the mixture. It is characterized by a freezing point below −10° C. It has at most a mild flowery odor when methyl, ethyl, and isopropyl alcohols are utilized in preparation. Alternatively, a mixture of terpineol and terpinyl ether is prepared in the manner hereinbefore described and terpineol prepared as herein described or as disclosed in my copending application Serial No. 64,169, filed February 26, 1936 is added in such proportion that there results a product comprising a mixture of terpineol and terpinyl ether, preferably terpinyl methyl ether, in which the terpinyl ether is in quantity ranging from about 3% to about 50%, preferably from about 8% to about 30% of the said mixture. In this manner, there are now obtained products having valuable surface active properties and which are, at the same time, characterized by a freezing point below about 0° C. and a very mild flowery odor.

In a broader concept, an improved surface active agent may be produced by adding a terpinyl ether of a lower aliphatic alcohol, or a mixture comprising such an ether, to any terpineol fraction to the extent of about 3% to about 50%, preferably about 8% to about 30% of the resulting composition.

The product is characterized by a freezing point at the very least 3° C. lower than the composition without the ether. This result is accomplished without impairment of the valuable surface active properties of the terpineol fraction. However, where the freezing point of a natural terpineol fraction is improved in this manner, the normal persistent odor of such fraction still persists. Hence, it is preferable to prepare the improved composition by reaction of pinene with a mixture of water and an alcohol as hereinbefore described.

In addition to the mixture of terpineol and terpinyl ether, my new product may comprise a quantity of terpene hydrocarbons, if desired and convenient. For some uses, for example in flotation of minerals and as an anti-skinning agent in paints, enamels, and varnishes, it is not always essential to eliminate hydrocarbons and thus unreacted pinene and other terpene hydrocarbons remaining in the reaction product mixture need not in all cases be distilled therefrom.

The improved product of this invention, comprising terpineol and a terpinyl ether, is useful because of its valuable surface active properties. For example, these properties make it useful as a detergent aid and wetting out agent in laundering and textile processing, in kier boiling and wool scouring; in fat-liquoring of leather, in delustering rayon; in flotation of minerals, etc.; in insecticides; in paints, enamels, varnishes, and lacquers as an anti-skinning agent or evaporation modifier; etc. Its low freezing point and only very mild odor greatly extend its usefulness in these fields as compared with prior products.

The following examples illustrate specific applications of the method of this invention. Throughout this application all parts and percentages are by weight unless otherwise specified.

Example 1

A mixture of 70 grams of water, 600 grams ethylene chlorhydrin, and 130 grams of phosphoric acid, the water and acid being added in the form of 65% phosphoric acid solution, were agitated with 400 grams of turpentine having a pinene content of about 90% for 5 hours at a temperature of 40 to 45° C. The system was then allowed to separate into two layers, the lower layer was drawn off for use in subsequent production, and the oily layer remaining was neutralized. The neutralized oily layer was then fractionated into 5 component portions as follows:

|   | Grams |
|---|---|
| 1. Unreacted turpentine | 88 |
| 2. Mono-cyclic terpene hydrocarbons | 108 |
| 3. Terpineol | 85 |
| 4. Terpinyl-beta-chlorethyl ether | 220 |
| 5. Still residue (mostly terpin) | 45 |

The terpineol obtained represented a yield of 21.1% on the basis of the turpentine reacted, and since the turpentine had a pinene content of approximately 90%, the yield of terpineol on the basis of the pinene actually reacted is 30%.

The terpinyl-beta-chlorethyl ether obtained represented a yield of 70.5% on the basis of the turpentine reacted which is equivalent to a yield of approximately 80% on the basis of the pinene actually reacted. The combined yield of desired products is thus approximately 110% based on the weight of the pinene which actually reacted.

Example 2

A mixture of 685 grams of water, 1,000 grams of ethylene chlorhydrin and 375 grams of phosphoric acid, the water and acid being added in the form of 35.4% phosphoric acid solution, was agitated with 1,000 grams of turpentine having a pinene content of about 90% for 6 hours at a temperature of 50 to 55° C. The system was then allowed to separate into two layers, the lower layer was drawn off for use in subsequent production, and the oily layer remaining was neutralized. The neutralized oily layer was then fractionated into 5 component portions as follows:

|   | Grams |
|---|---|
| 1. Unreacted turpentine | 396 |
| 2. Mono-cyclic terpene hydrocarbons | 104 |
| 3. Terpineol | 392 |
| 4. Terpinyl-beta-chlorethyl ether | 284 |
| 5. Still residue (mostly terpin) | 90 |

The terpineol obtained represented a yield of 64.9% on the basis of the turpentine reacted, and since the turpentine had a pinene content of approximately 90%, the yield of terpineol on the basis of the pinene actually reacted is 68%.

The terpinyl-beta-chlorethyl ether obtained represented a yield of 47% on the basis of the turpentine racted which is equivalent to a yield of approximately 49% on the basis of the pinene actually reacted. The combined yield of desired products is thus approximately 117% based on the weight of the pinene which actually reacted.

Example 3

A mixture of 1,250 grams of water, 1,000 grams ethylene chlorhydrin, and 750 grams of phosphoric acid, the water and acid being added in the form of 37.5% phosphoric acid solution, was agitated with 2,000 grams of turpentine having a pinene content of about 90%, for 16 hours at a temperature of 40 to 45° C. The system was then allowed to separate into two layers, the lower layer was drawn off for use in subsequent production, and the oily layer remaining was neutralized. The neutralized oily layer was then fractionated into 4 component portions as follows:

|   | Grams |
|---|---|
| 1. Unreacted turpentine | 616 |
| 2. Mono-cyclic terpene hydrocarbons | 342 |
| 3. Terpineol | 888 |
| 4. Terpinyl-beta-chlorethyl ether | 244 |

The terpineol obtained represented a yield of 63.8% on the basis of the turpentine reacted, and since the turpentine had a pinene content of approximately 90%, the yield of terpineol on the basis of the pinene actually reacted is 71%.

The terpinyl-beta-chlorethyl ether obtained represented a yield of 12.2% on the basis of the turpentine reacted which is equivalent to a yield of approximately 20% on the basis of the pinene actually reacted. The combined yield of desired products is thus approximately 91% based on the weight of the pinene which actually reacted.

Example 4

A mixture of 1,100 grams of water, 1,000 grams of ethylene chlorhydrin, and 400 grams of sodium acid sulphate was agitated with 1,500 grams of turpentine having a pinene content of about 90%, for 6 hours at a temperature of 65 to 70° C. The system was then allowed to separate into 2 layers, the lower layer was drawn off for use in subsequent production, and the oily layer remaining was neutralized. The neutralized oily layer was then fractionated into 5 component portions as follows:

|   | Grams |
|---|---|
| 1. Unreacted turpentine | 600 |
| 2. Mono-cyclic terpene hydrocarbons | 120 |
| 3. Terpineol | 555 |
| 4. Terpinyl-beta-chlorethyl ether | 150 |
| 5. Still residue (mostly terpene) | 142 |

The terpineol obtained represented a yield of 61.6% on the basis of the turpentine reacted, and since the turpentine had a pinene content of approximately 90%, the yield of terpineol on the basis of the pinene actually reacted is 68%.

The terpinyl-beta-chlorhydrin ether obtained represented a yield of 16.6% on the basis of the turpentine reacted which is equivalent to a yield of approximately 18.5% on the basis of the pinene actually reacted. The combined yield of desired products is thus approximately 87% based on the weight of the pinene which actually reacted.

*Example 5*

A mixture of 1,470 grams of water, 1,000 grams of ethylene chlorhydrin, and 30 grams of sulphuric acid was agitated with 2,000 grams of turpentine having a pinene content of about 90%, for 22 hours at a temperature of 58 to 68° C. The system was then allowed to separate into two layers, the lower layer was drawn off for use in subsequent production, and the oily layer remaining was neutralized. The neutralized oily layer was then fractionated into 5 component portions as follows:

|   | Grams |
|---|---|
| 1. Unreacted turpentine | 520 |
| 2. Mono-cyclic terpene hydrocarbons | 174 |
| 3. Terpineol | 968 |
| 4. Terpinyl-beta-chlorethyl ether | 260 |
| 5. Still residue (mostly terpene) | 278 |

The terpineol obtained represented a yield of 65.4% on the basis of the turpentine reacted, and since the turpentine had a pinene content of approximately 90%, the yield of terpineol on the basis of the pinene actually reacted is 72.7%. The terpinyl-beta-chlorethyl ether obtained represented a yield of 17.5% on the basis of the turpentine reacted which is equivalent to a yield of approximately 20% on the basis of the pinene actually reacted. The combined yield of desired products is thus approximately 93% based on the weight of the pinene which actually reacted.

The following data is given in illustration of a typical analysis of the terpineol and terpinyl-beta-chlorethyl ether obtained according to Examples 1 to 5 inclusive:

|   | Terpineol | Terpinyl-beta-chloro ethyl ethers |
|---|---|---|
| Sp. gr. at 15.5° C | .9385 | 1.025 |
| R. I. at 20.0° C | 1.4827 | 1.4831 |
| Percent tertiary alcohols | 89.0 |  |
| Percent secondary alcohols | 7.7 |  |
| Boiling range: |  |  |
| 5 percent °C | 214.5 | 227.0 |
| 20 percent °C | 215.6 | 235.5 |
| 50 percent °C | 218.0 | 240.5 |
| 70 percent °C | 219.3 | 246.0 |
| 90 percent °C | 221.4 | 252.0 |
| 95 percent °C | 225.0 | 255.0 |
| Color | Water white | Water white |

The terpinyl-beta-chlorethyl ether described above probably contains several isomers; however, the quantity of these is not known.

*Example 6*

A mixture of 1500 grams monoethyl ether of ethylene glycol, 2000 grams of gum turpentine containing about 90% pinene, 400 grams water, and 400 grams sulphuric acid, the acid and water being in the form of a 50% solution of sulphuric acid, were agitated at 40–43° C. for a period of 6.5 hours. Excess water soluble components were then separated, the product neutralized, and the oily components separated by fractionation to yield:

|   | Grams |
|---|---|
| 1. Unreacted turpentine | 573 |
| 2. Mono-cyclic terpene hydrocarbons | 421 |
| 3. Terpineol | 492 |
| 4. Terpene ethers of ethyl glycol ether | 570 |

On the basis of the pinene in the turpentine consumed, the terpineol and terpene ether yields were 38.5% and 44.4% respectively; thus the combined yield of useful products was approximately 83%.

*Example 7*

A mixture of 1000 grams of monoethyl ether of diethylene glycol, 850 grams of alpha pinene, and 150 grams of 67% sulphuric acid water solution were agitated at 45–55° C. for a period of 8.5 hours. Water soluble components were then separated, the oily products neutralized and fractionated. A yield of 90 grams of terpineol and 610 grams terpene ethers of the ethyl ether of diethylene glycol was obtained; this combined yield was 82.4% of the pinene charged.

*Example 8*

A mixture of 1,000 grams of water, 800 grams of methanol, and 500 grams of 94% sulphuric acid was agitated with 2,165 grams of turpentine for a period of 12 hours at a temperature of 40° C. ±3° C. The system was then allowed to separate into two layers and the lower layer drawn off. The oily layer remaining was neutralized with sodium hydroxide. The methanol present was distilled off at atmospheric pressure and the product remaining was then fractionated in vacuum into 4 component portions as follows:

|   | Grams |
|---|---|
| 1. Unreacted turpentine | 356 |
| 2. Mono-cyclic terpene hydrocarbons | 356 |
| 3. Mixture of terpineol and terpinyl methyl ether | 1,641 |
| 4. Still residue | 108 |

The mixture of terpineol and terpinyl methyl ether obtained represented a yield of 76% by weight of the turpentine charged. Since the turpentine had a pinene content of approximately 90%, the yield of the said mixture on the basis of the pinene which actually reacted was 89%, by weight.

The mixture of terpineol and terpinyl methyl ether was a product suitable for use as a solvent and surface active agent, or as a source of terpineol and terpinyl methyl ether obtainable by fractionation. This mixture had the following analysis:

| | |
|---|---|
| Specific gravity at 15.5° C | .9291 |
| Refractive index at 20.0° C | 1.4768 |
| Per cent tertiary methyl ethers | 39.0 |
| Per cent termiary alcohols | 58.0 |
| Boiling range: | |
| 5% | 209.0° C. |
| 20 | 213.2 |
| 50 | 216.0 |
| 70 | 217.5 |
| 90 | 220.0 |
| 95 | 225.5 |
| Freezing point | Below −10° C. |
| Color | Water white |
| Odor | Very mild |

*Example 9*

A mixture of 1,000 grams of water, 816 grams of ethyl alcohol, and 600 grams of 94% sulphuric acid was agitated with 2000 grams of turpentine having a pinene content of about 90% for 4½ hours at a temperature of 45 to 50° C. The system was then allowed to separate into two layers and the lower layer was drawn off. The oily layer remaining was neutralized with sodium hydroxide, and the alcohol remaining therein was distilled off at atmospheric pressure. The material remaining was then fractionated in vacuum into the following components:

1. Unreacted turpentine and monocyclic terpene hydrocarbons_____ 810 cc.
2. Mixture of terpineol and terpinyl ethyl ether_____ 1,050 cc.
3. Still residue_____ 170 cc.

The mixture of terpineol and terpinyl ethyl ether represents a product having uses similar to the product obtained in Example 8. The analysis of this product was as follows:

Specific gravity at 15.5° C_____ .9326
Refractive index at 20.0° C_____ 1.4796
Percent tertiary ethyl ethers_____ 14.1%
Percent tertiary alcohols_____ 76.0%

Boiling range:

| | |
|---|---|
| 5% | 215.0° C. |
| 20 | 218.0 |
| 50 | 220.0 |
| 70 | 221.6 |
| 95 | 226.5 |

Freezing point _____ Below —10° C.

Odor_____Very mild
Color_____Water white

*Example 10*

A mixture of 250 grams of water, 250 grams of methanol, and 244 grams of crude benzene sulphonic acid was agitated with 1,000 grams of alpha pinene for 11 hours at a temperature of 35 to 40° C. The system was allowed to separate into two layers and the lower layer was drawn off. The oily layer remaining was neutralized, steam distilled, and then fractionated. A hydrocarbon fraction of 79 grams which represents 7.9% of the pinene charged was obtained. A mixture of terpineol and terpinyl methyl ether, weighing 660 grams and representing a yield of 66% on the basis of the pinene charged, was also obtained.

It will be understood that the details and examples given hereinbefore are illustrative only and in no way limiting on my invention as broadly described hereinbefore and in the appended claims.

What I claim and desire to protect by Letters Patent is:

1. The process of reacting a mixture of water and an alcohol with a dicyclic unsaturated terpene compound in the presence of a suitable acidic catalyst, whereby a mixture of a terpene alcohol and a terpene ether is obtained, and recovering the terpene alcohol and terpene ether from the reaction mixture.

2. The process of reacting a mixture of water and an alcohol with a dicyclic unsaturated terpene compound at a temperature in the range from about 0° C. to about 70° C. in the presence of a suitable acidic catalyst, whereby a mixture of a terpene alcohol and a terpene ether is obtained, and recovering the terpene alcohol and terpene ether from the reaction mixture.

3. The process of reacting a mixture of water and an alcohol with pinene in the presence of a suitable acidic catalyst, whereby a mixture of terpineol and a terpinyl ether is obtained, and recovering the terpineol and terpinyl ether from the reaction mixture.

4. The process of reacting a mixture of water and an alcohol with pinene at a temperature in the range from about 0° C. to about 70° C., in the presence of a suitable acidic catalyst, whereby a mixture of terpineol and a terpinyl ether is obtained, and recovering the terpineol and terpinyl ether from the reaction mixture.

5. The process of reacting a mixture of water and an alcohol, the water in quantity from about $1/15$ to about 5 times the weight of the alcohol, with pinene at a temperature in the range from about 0° C. to about 70° C. in the presence of a suitable acidic catalyst, whereby a mixture of terpineol and a terpinyl ether is obtained, and recovering the terpineol and terpinyl ether from the reaction mixture.

6. The process of reacting a mixture of water and methyl alcohol, the water in quantity from about $1/15$ to about 5 times by weight of the alcohol, with pinene at a temperature in the range from about 0° C. to about 70° C. in the presence of a suitable acidic catalyst, whereby a mixture of terpineol and a terpinyl ether is obtained, and recovering the terpineol and terpinyl ether from the reaction mixture.

7. The process of reacting a mixture of water and ethyl alcohol, the water in quantity from about $1/15$ to about 5 times the weight of the alcohol, with pinene at a temperature in the range from about 0° C. to about 70° C. in the presence of a suitable acidic catalyst, whereby a mixture of terpineol and a terpinyl ether is obtained, and recovering the terpineol and terpinyl ether from the reaction mixture.

8. A process for the preparation of terpinyl ethers unstable in the presence of anhydrous strong acids which comprises the steps of reacting pinene with the alcohol corresponding to the said ether, in admixture with water in amount sufficient to prevent decomposition of the said ether, in the presence of a suitable acidic catalyst, and recovering the ether from the reaction mixture.

9. A process for the preparation of terpinyl beta-chlorethyl ether which comprises the steps of reacting pinene with ethylene chlorhydrin in admixture with water in amount sufficient to prevent decomposition of the said ether, at a temperature in the range from about 0° C. to 70° C. in the presence of a suitable acidic catalyst, and recovering the terpinyl beta-chlorethyl ether from the reaction mixture.

10. A process for the preparation of terpinyl beta-chlorethyl ether which comprises the steps of reacting pinene with ethylene chlorhydrin in admixture with water in amount in the range of from $1/20$ to twice the weight of the ethylene chlorhydrin, at a temperature in the range from about 0° C. to 70° C. in the presence of a suitable acidic catalyst, and recovering the terpinyl beta-chlorethyl ether from the reaction mixture.

11. A process for the preparation of terpinyl beta-chlorethyl ether which comprises the steps of reacting pinene with ethylene chlorhydrin in admixture with water in amount sufficient to prevent decomposition of the said ether, at a temperature in the range from about 0° C. to 70° C. in the presence of phosphoric acid, and recovering the terpinyl beta-chlorethyl ether from the reaction mixture.

12. The process of reacting a mixture of water and an alcohol with turpentine in the presence of a suitable acidic catalyst, whereby a mixture of terpineol and a terpinyl ether is obtained, and recovering the terpineol and terpinyl ether from the reaction mixture.

13. The process of reacting a mixture of water and an alcohol with a dicyclic unsaturated terpene compound at a temperature in the range from about 0° C. to about 70° C. in the presence of a suitable acidic catalyst, whereby a terpene alcohol is obtained, and recovering the terpene alcohol from the reaction mixture.

14. The process of reacting a mixture of water and an alcohol with pinene in the presence of a suitable acidic catalyst, whereby terpineol is obtained, and recovering the terpineol from the reaction mixture.

DONALD H. SHEFFIELD.